(12) United States Patent
Peltz et al.

(10) Patent No.: US 7,162,337 B2
(45) Date of Patent: Jan. 9, 2007

(54) AUTOMATIC NEUTRAL SECTION CONTROL SYSTEM

(75) Inventors: David Michael Peltz, Melbourne, FL (US); James Glen Corry, Palm Bay, FL (US); Eugene A. Smith, Satellite Beach, FL (US)

(73) Assignee: General Electric Company, Schenectady, NY (US)

( * ) Notice: Subject to any disclaimer, the term of this patent is extended or adjusted under 35 U.S.C. 154(b) by 130 days.

(21) Appl. No.: 11/083,908

(22) Filed: Mar. 18, 2005

(65) Prior Publication Data

US 2005/0240322 A1    Oct. 27, 2005

Related U.S. Application Data

(60) Provisional application No. 60/565,319, filed on Apr. 26, 2004.

(51) Int. Cl.
*B60L 9/00* (2006.01)
*B60M 3/00* (2006.01)

(52) U.S. Cl. .......................................... 701/19; 105/49
(58) Field of Classification Search ...................... None
See application file for complete search history.

(56) References Cited

U.S. PATENT DOCUMENTS

| | | | | |
|---|---|---|---|---|
| 3,957,236 A | * | 5/1976 | Phelps et al. | 246/187 B |
| 4,301,899 A | * | 11/1981 | McSparran et al. | 191/3 |
| 5,117,072 A | | 5/1992 | White | |
| 5,129,605 A | * | 7/1992 | Burns et al. | 246/5 |
| 5,654,634 A | | 8/1997 | Minderlein | |
| 5,788,033 A | | 8/1998 | Lucking et al. | |
| 5,813,635 A | * | 9/1998 | Fernandez | 246/168 |
| 5,969,643 A | * | 10/1999 | Curtis | 340/988 |
| 6,206,156 B1 | | 3/2001 | Nunlist | |
| 6,505,103 B1 | * | 1/2003 | Howell et al. | 701/19 |
| 6,523,654 B1 | | 2/2003 | Brooks | |
| 6,915,191 B1 | * | 7/2005 | Kane et al. | 701/19 |
| 2004/0245410 A1 | * | 12/2004 | Kisak et al. | 246/3 |

* cited by examiner

*Primary Examiner*—Michael J. Zanelli
(74) *Attorney, Agent, or Firm*—Carlos Luis Hanze; William David Sartor; Beusse Wolter Sanks Mora & Maire, PA

(57) ABSTRACT

A method of controlling a neutral section operation of a train (14) including a lead locomotive (16) and at least one remote locomotive (12) in communication with the lead locomotive. The locomotives are electrically powered from respective electrical connections to a catenary (22) having at least one neutral section (26). The method includes sensing when a lead locomotive is proximate the neutral section of the catenary. The lead locomotive then commands the remote locomotive to perform a neutral section operation when the lead locomotive has traveled a distance equal to a distance (20) between the lead locomotive and the remote locomotive. The lead locomotive determines when to issue a neutral section command based on a speed of the lead locomotive and an elapsed time from when the lead locomotive senses its location proximate the neutral section.

28 Claims, 4 Drawing Sheets

AUTOMATIC NEUTRAL SECTION CONTROL SYSTEM

CROSS REFERENCE TO RELATED APPLICATIONS

This application claims priority to U.S. Provisional Application Ser. No. 60/565,319 filed on Apr. 26, 2004, and incorporated herein by reference.

FIELD OF THE INVENTION

This invention relates to the field of control of locomotives, and in particular, to controlling an operation of an electrically powered locomotive with respect to neutral sections of a catenary supplying electrical power to the locomotive.

BACKGROUND OF THE INVENTION

Railway trains may include a lead locomotive and one or more remote locomotives distributed throughout a length of the train for providing cumulative or reserve motoring capacity. Typically, an operator is stationed on the lead locomotive to control movement of the train by directly controlling operation of the lead locomotive and remotely controlling the remote locomotives. Each remote unit typically receives control information corresponding to control inputs provided by the operator in the lead locomotive and adjusts its operation according to the received control information.

Locomotives are known to be powered by electrical current sourced from a catenary, such as via a pantograph contacting an overhead wire carrying sufficient electric current to power the locomotive. However, the catenary may be discontinuous and include neutral sections, or split phasing sections, where no electricity is available to power a locomotive. For example, different sections of a catenary may be energized by different power plants producing power having different phases of electrical power such that the phase of power available at each section may varies from section to section. Consequently, to pass through a neutral section, traction motors of a locomotive are typically turned off, a main circuit breaker of the locomotive is opened, and, in some cases, the pantograph is lowered before reaching the neutral section so that the locomotive is disconnected form the catenary, and consequently, the locomotive remains un-powered while disconnected. While an operator on a lead locomotive may directly control a neutral section operation for a lead locomotive, unmanned remote locomotives being remotely controlled by a lead locomotive need to be instructed to perform such procedures before passing through the neutral section.

DETAILED DESCRIPTION OF THE INVENTION

Figure 1:
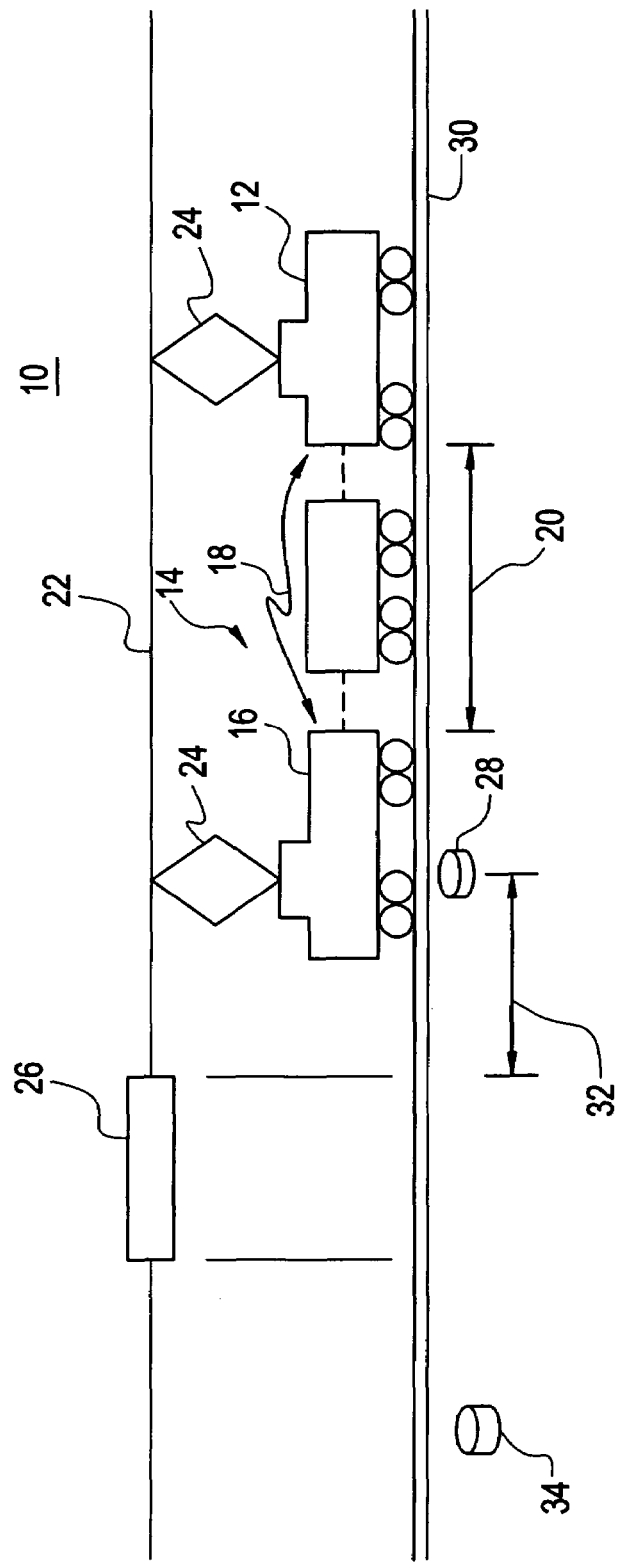
FIG. 1 shows a prior art system 10 for controlling a neutral section operation of a remote locomotive of a train.

A duration of a neutral section disconnection of locomotives in a train receiving electrical power, for example, from an overhead catenary, needs to be minimized to maintain an operating speed of the train and to minimize in-train forces that may arise from powering down and re-powering locomotives distributed throughout the train. Accordingly, a method and system for accurately and reliably controlling a neutral section operation of locomotives of a train is desired. FIG. 1 shows a schematic of a prior art system 10 for controlling a neutral section operation of a remote locomotive 12. The system 10 includes a train 14 comprising a lead locomotive 16 followed by one or more remote locomotives 12 in communication with the lead locomotive 16 over communication link 18. For example, the communication link 18 may be a wireless, hardwired, or fiber optic link. The remote locomotive 12 may be spaced a known distance 20 away from the lead locomotive 16, and such distance 20 may be occupied by one or more other rail vehicles, such as railcar 15. The locomotives 12, 16 may be electrically powered from respective electrical connections to a catenary 22, such as by a pantograph 24 mounted atop the locomotive 12, 16. In some applications, the catenary 22 may have one or more neutral sections 26 requiring the locomotives 12, 16 to be disconnected from the catenary 22 while passing through the neutral section 26.

For trains 14 comprising one or more remote locomotives 12 remotely controlled, for example, by a lead locomotive 16, each of the remote locomotives 12 must be notified to perform a neutral section operation to electrically disconnect the remote locomotive 12 from the catenary 22, such as lowering the pantograph 24 and/or opening a circuit breaker on the remote locomotive 12. In the past, notification of an approach to a neutral section 18 of a catenary 22 has been provided by the lead locomotive 16 detecting its location near the neutral section 26, for example, by sensing a location identifier, such as a magnet 28, in the rail bed of the railway 30 positioned a distance 32 away from the neutral section 26. Upon detecting the location identifier, the lead locomotive 16 indicates to the remote locomotive 12 when the lead locomotive 16 is near the neutral section 26. Based on the known distance 20 between the lead locomotive 16 and the notified remote locomotive 12 and a speed of the train 14, the remote locomotive 12 self-determines when the remote locomotive 12 is expected to arrive at the neutral section 26 so that the remote locomotive 12 knows when to perform a neutral section operation.

In the past, the distances 20 to respective trail locomotives 12 in the train 14 have been roughly measured by entering a previously defined distance between the lead and remote locomotives or counting the number of known length rail cars and/or locomotives between the lead locomotive 16 and respective remote locomotives 12. The distances 20 may then be input into a remote control system of the lead locomotive 16, such as by an operator onboard the lead locomotive 16, such as a LOCOTROL® locomotive remote control system available from the assignee of the present invention. Upon determining that the remote locomotive 12 has traveled the known distance 20 after the lead locomotive has detected the location identifier and notified the remote locomotive 12, the remote locomotive 12 performs the neutral section operation as it enters the neutral section 26. A second magnet 34 may be provided on an opposite side of neutral section 26 to notify that a locomotive has passed through the neutral section 26 and also to notify a locomotive coming from the opposite direction that it is approaching the neutral section. Alternatively, the locomotive may monitor the catenary voltage and detection of the catenary voltage indicates that the locomotive has passed through the Neutral Section.

Such known systems for identifying neutral sections that use rail bed magnets and imprecise distances to trail locomotive measurements may not provide a level of safety and convenience desired for high capacity rail operations. Magnets mounted on or near the tracks can be torn off by equipment dragging on the train. Trackside equipment is also subject to vandalism and theft. Equipment on board the train is subject to shock and vibration and extreme operating temperatures. Systems that require operator actions for setup are subject to errors and take time away from operating the train and moving commodity. To compound the problem, driverless remote locomotives spaced throughout the train may be spaced at different intervals, depending on how many cars are placed between the locomotives in the train. Furthermore, when using a neutral second location identifier such as a magnet, the identifier needs to be positioned far enough away from the neutral section so that a fastest expected train has sufficient time to perform a neutral section operation after sensing the location identifier train before the train enters the neutral section. Consequently, slower trains sensing the location identifier positioned for the fastest expected train may perform a neutral section operation too soon, resulting in a loss of power for a period longer than would be required if a precise distance to the neutral section were known.

Figure 2:
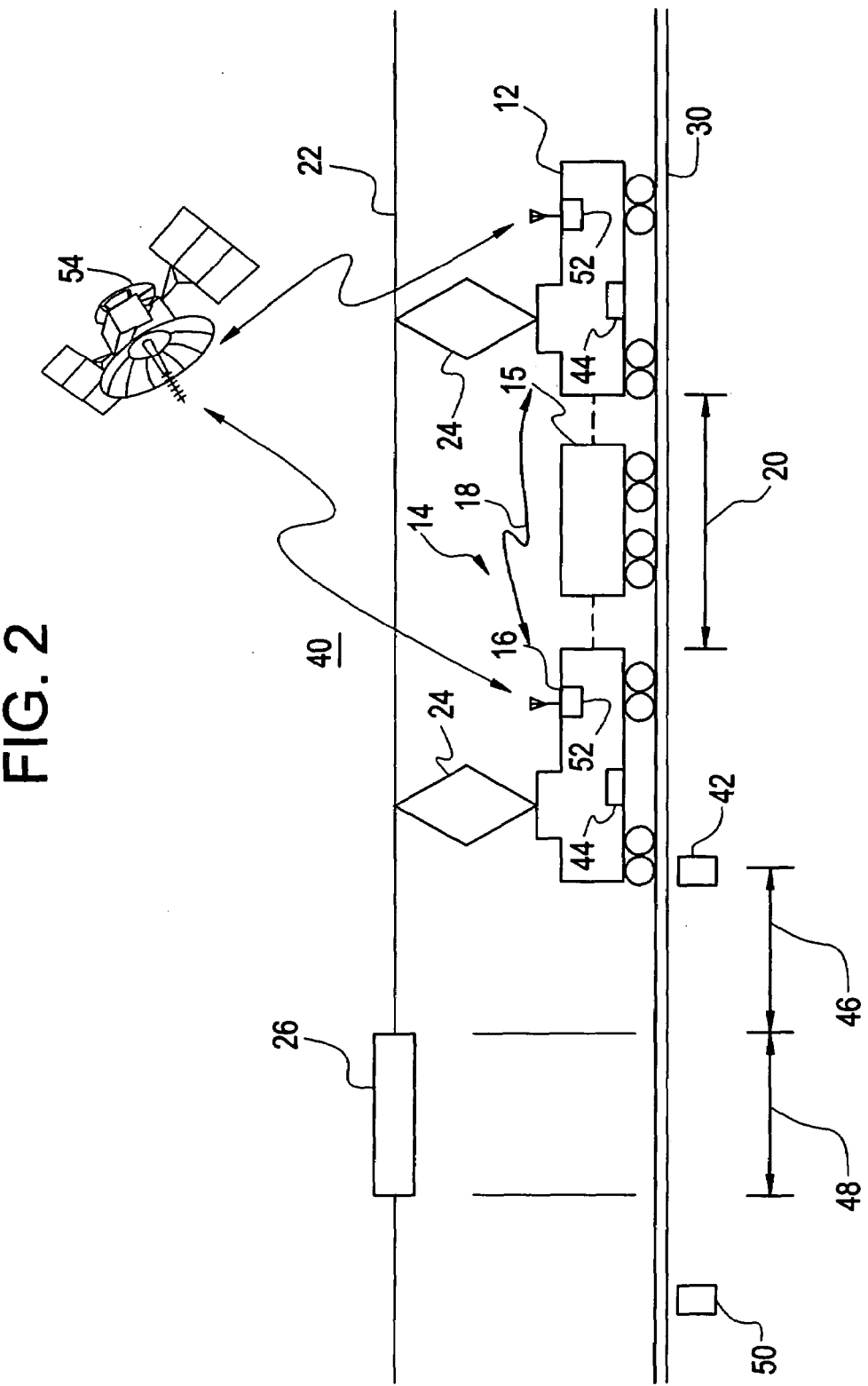
FIG. 2 shows an improved system 40 for controlling a neutral section operation of a remote locomotive of a train.

An improved system 40 for controlling a neutral section operation of a remote locomotive is illustrated in FIG. 2 as including a train 14 comprising a lead locomotive 16 followed by one or more remote locomotives 12 in communication with the lead locomotive 16 over communication link 18. The remote locomotive 12 may be spaced a known distance 20 away from the lead locomotive 16. The locomotives 12, 16 may be electrically powered from respective electrical connections to a catenary 22, such as by a pantograph 24 mounted atop the locomotive 12, 16. The catenary 22 may have one or more neutral sections 26 requiring the locomotives 12, 16 to be disconnected from the catenary 22 while passing under the neutral section 26. In an aspect of the invention, a transponder 42, such as an RFID tag or automated equipment identifier (AEI) tag may by positioned, for example, in the rail bed of the railway 30 a distance 46 away from the neutral section 26. Each of the locomotives 12, 16 may include a transponder reader 44 for sensing the transponder 42 as the respective locomotive 12, 16 approaches the neutral section 26.

The distance 46 of the transponder 42 from the neutral section 26 may be sufficiently far so that a fastest expected train has sufficient time to perform a neutral section operation after sensing the transponder 42 before the train enters the neutral section. In an aspect of the invention, a neutral section operation of a locomotive 12, 16 may be delayed, based on the speed of the train, from when the locomotive 12, 16 is determined to have arrived proximate the neutral section, such as by detecting the transponder, so that a time period of the locomotive 12, 16 being electrically disconnected from the catenary is minimized. In an embodiment, the transponder 42 may be encoded with its distance 46 from the neutral section 26 which may be read by the transponder reader 44 on the locomotive 12, 16. A locomotive 12, 16 approaching the neutral section 26 and sensing the transponder 42 is therefore able to determine its distance from the neutral section 26 upon reading the distance 46 information encoded in the transponder. After reading the distance 46 information, the locomotive 12, 16 is able to predict when the locomotive 12, 16 is expected to arrive at the neutral section based on the distance 46 encoded in the transponder 42 and the locomotive's speed. Accordingly, unlike conventional systems, a neutral section operation may be timed to be performed just before the locomotive 12, 16 enters the neutral section 26, regardless of a speed of the locomotive 12, 16, so that a disconnection from the catenary may be minimized. A neutral section operation may be started sufficiently soon enough before the locomotive 12, 16 is expected to enter the neutral section 26 so that the neutral section 26 operation is completed just as the locomotive 12, 16 enters the neutral section 26. For example, a neutral section operation that takes one second to complete may be scheduled to start one second before the locomotive 12, 16 is expected to enter the neutral section 26. Encoding the transponder 42 with distance information allows the transponder 42 to be located a distance farther away from the neutral section 26 than conventionally required to ensure timely disconnection of a fastest train. For example, if it is not possible to place a transponder 26 in a certain location, such as on a bridge, a distance encoded transponder may be placed on an opposite side of the bridge away from the neutral section 26 so that the distance encoded in the transponder 26 allows a passing locomotive to minimize its disconnection time from the catenary based on its speed and the encoded distance to the neutral section.

Other information, such as a length 48 of the neutral section 26, may be encoded in the transponder so that the locomotive 12, 16 is able to determine, based on the speed of the locomotive 12, 16, when the locomotive 12, 16 will emerge from the neutral section and may then reestablish an electrical connection with the catenary 22. Information related to sensing of the transponder by each locomotive 12, 16 may be sent to other locomotives 16, 12 in the train 14 via communication link 18. Another transponder 50 may be provided on an opposite side of neutral section 26 to notify a locomotive coming from the opposite direction that it is approaching the neutral section 26.

In another exemplary embodiment, the locomotives 12, 16 may be configured with a respective location determination device, such as a GPS receiver 52 in communication with one or more GPS satellites 54, to determine a location of the locomotives 12, 16 relative to the neutral section 26. Based on a known location of the neutral section and a determined location of the locomotive 12, 16 with respect to the neutral section, the locomotive 12, 16 is able to determine when to perform a neutral section operation.

An improved method for controlling a neutral section operation of a train 14, such as a neutral section operation of a remote locomotive 12 following a lead locomotive 16 in the train 14, may include sensing when the lead locomotive 16 is proximate a neutral section 26 of a catenary 22, such as by using the transponder or GPS techniques described previously. After sensing the location of the lead locomotive 16, a time when the lead locomotive 16 of the train has traveled a distance corresponding to a predetermined distance 20 between the lead locomotive 16 and a remote locomotive 12 of the train 14 may be determined based on a speed of the lead locomotive 16 and the distance 20 between the locomotives 12, 16. When the lead locomotive 16 has traveled the distance 20 away from the neutral section 26, the remote locomotive 12 will arrive proximate at the neutral section 26. Accordingly, when the lead locomotive 16 has traveled that distance 20, the lead locomotive 16 may command the remote locomotive 12 to perform a neutral section operation.

In another embodiment, a method for controlling a neutral section operation includes determining, at the lead locomotive 16 of the train 14, when the lead locomotive 16 has traveled a distance corresponding to a predetermined distance 20 between the lead locomotive 16 and a remote locomotive 12 of the train 14. The time when the lead locomotive 16 has traveled the distance may be determined based on a speed of the lead locomotive 16 and a distance 20 between the locomotives 12, 16. A signal may be provided to the remote locomotive 12 to notify the remote locomotive 12 when the lead locomotive 16 has sensed its location proximate the neutral section 26. The remote locomotive 12 also determines when it has traveled the distance 20, based on a speed of the remote locomotive, the distance 20, and the receipt of a signal from the lead locomotive 16 that the lead locomotive 16 is proximate the neutral section 26. The remote locomotive 12 also directly senses a location the neutral section 26, such as by reading the transponder 42. A neutral section operation of the remote locomotive 12 is then performed in response to any one of the three independent determinations: the determination of the lead locomotive 16 having traveled the distance, the determination of the remote locomotive 12 having traveled the distance, and the remote locomotive 12 sensing the location of the remote locomotive 12 proximate the neutral section. This redundancy thereby ensuring that the neutral section operation is performed, should one or two of the determinations or sensing activities fail.

In another aspect of the invention, communications between locomotives 12, 16 may be time calibrated to ensure that timely neutral section operations are performed. Respective clocks on board the locomotives 12, 16 may be synchronized, for example relative to a common clock source, such as a GPS satellite 54. In an embodiment, the lead locomotive 16 generates a signal comprising a time stamp corresponding to a time when the lead locomotive 16 senses its location proximate the neutral section and transmits the time stamped signal to the remote locomotive. Upon receiving the signal, the remote locomotive 12 compares the time stamp to a time, determined by a clock on the remote locomotive, when the remote locomotive 12 receives the signal. The remote locomotive 12 then determines if a time delay between the time stamp of the signal and the time exceeds a predetermined value. When the time delay exceeds the predetermined value, a timing of a neutral section operation of the remote locomotive 12 may be controlled to account for the time delay, such as by adjusting a distance traveled by the remote locomotive 12 to reach the neutral section to account for a distance traveled by the locomotive during the time delay. In an embodiment, the time signal may include a distance parameter indicative of a distance of the remote locomotive 12 from the neutral section, such as a predetermined distance between the lead locomotive 16 location and the remote locomotive. Controlling the timing of the neutral section operation of the remote locomotive 12 may include modifying the distance parameter to account for a travel distance the remote locomotive 12 travels during the time delay.

In another aspect of the invention, calculating a time period required for the remote locomotive 12 to travel the predetermined distance 20 measured from the time when the remote locomotive 12 receives the signal may include determining if the neutral section operation command expected to be received from the lead locomotive 16 has not been received within the time period. When the neutral section operation command has not been received within the time period, the remote locomotive 12 may perform the neutral section operation, for example, based on a self determined travel distance or sensing its location relative to the neutral section.

Distances between members of a railway train, such as a distance 20 between a lead locomotive 16 and a remote locomotive 12 of a train 14, may be determined by calculating a distance traveled by a first member of a railway train based on a speed of the first member and an elapsed time from a time of the first member moving past a geographic point to a time of the first member receiving an indication of a second member of the train moving past the geographic point. For example, the first member may generate a first signal indicative of a time of the occurrence of the first member moving past the geographic point and transmit the first signal to the second member of the train to notify the second member that the first member has passed the geographic point. The second member may then sense an occurrence of the second member moving past the geographic point. The second member then generates a second signal indicative of the occurrence of the second member moving past the geographic point and transmits the second signal from the second member to the first member. The distance calculation may then be done either or both members. In an embodiment, a transponder, such as an RFID tag, may be positioned at the geographic point along a rail in a railyard to allow a locomotive having a transponder reader to sense its location relative to the geographic point as the locomotive passes the transponder. A distance traveled by the second member may then be calculated based on a speed of the second member and an elapsed time from a time of the second member receiving an indication of the first member moving past the geographic point to a time of the second member moving past the geographic point.

The calculated distances traveled by the respective members may then be compared to determine if a difference between the distance calculated by the first member and the distance calculated by the second member is within a desired range. If the difference exceeds a desired range, then the calibration may be rerun, or correction parameters, such as time delay correction factors, may be incorporated into any subsequent calculations involving distances between the first and second members, In another embodiment, transmitted signals (indicative of each member sensing its location relative to the geographic point) may include a time stamp to allow a recipient of the signal to compare the time stamp to an internal clock of the recipient to compensate for any time delays or time discrepancies in subsequent communications. In another embodiment, two or more spaced apart transponders may be used to perform distance calibrations using the above described techniques. By using two or more transponders encoded with transponder distances between the transponders, the distance calibrations performed using the above described techniques may be further verified by comparing the encoded transponder distances to distances calculated by the respective members.

Figure 3:
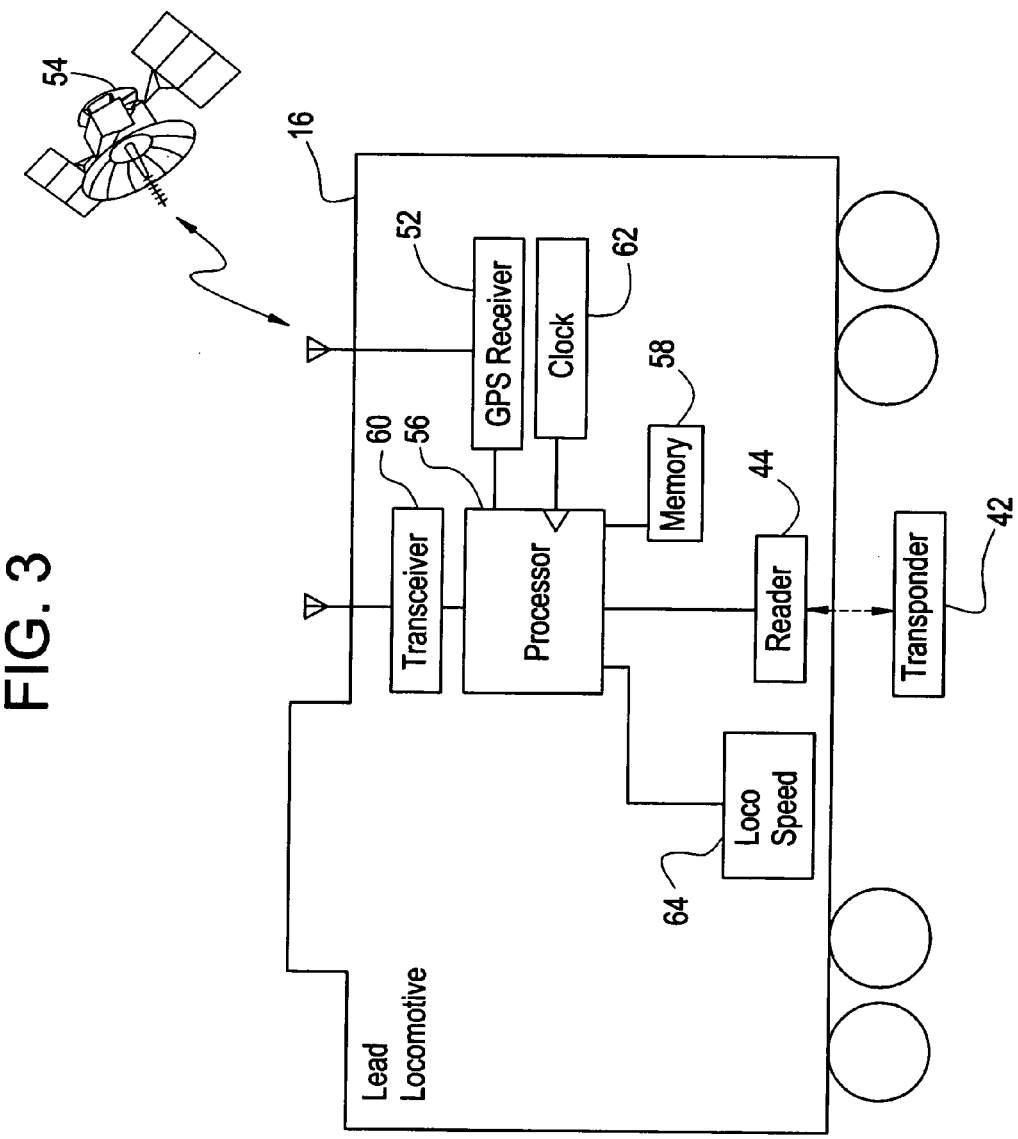
FIG. 3 shows a block diagram of an exemplary lead locomotive of the train of FIG. 2.
Figure 4:
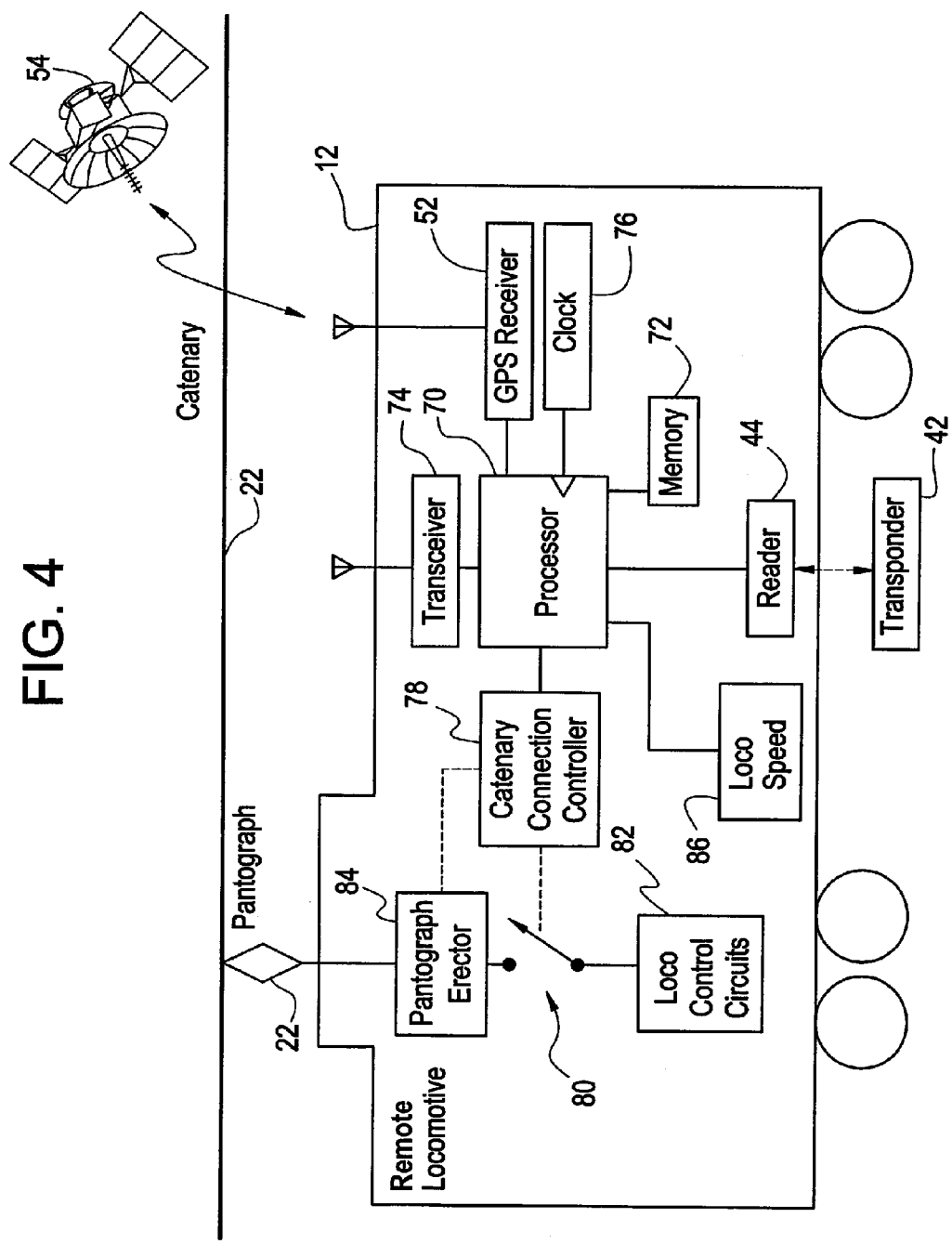
FIG. 4 shows a block diagram of an exemplary remote locomotive of the train of FIG. 2.

FIGS. 3 and 4 show exemplary block diagrams of a lead locomotive 16 and a remote locomotive, respectively, for performing the above described methods for controlling neutral section operations. The lead locomotive 16 of FIG. 3 includes a processor 56 in communication with a memory 58 for storing processor instructions, a transceiver 60 for communication with other locomotives in the train 14 (such as the remote locomotive of FIG. 4), a clock 62, a speed sensor 64, and a transponder reader 44. The processor 56 includes logic operative with instructions stored in memory 58 and communicates with the transceiver 60, speed sensor 64, clock 62, and transponder reader 44 to perform the methods described previously. The transponder reader 44 reads a transponder 42, such as an AEI tag located near a neutral section, and indicates to the processor 56 when the locomotive 16 is approaching the neutral section. The transponder reader 44 may also provided a distance to the neutral section, for example, encoded in the transponder being read, to the processor 56. Upon receiving a signal from the transponder reader 44 indicative of proximity to a neutral section, the processor 56 may notify other locomotives in the train, via the transceiver 60, that the lead locomotive 16 is approaching the neutral section.

The lead locomotive 16 may also include a location determination device such as a GPS receiver 52 in communication with a GPS satellite 54 for providing location information. The processor 56 may receive location information from the GPS receiver 52 and correlate the location information with a known neutral section location, for example, stored in memory 58, for determining a proximity to a neutral section. The processor 56 may communicate with the clock 62 to provide time stamps for signals sent to other locomotives via the transceiver 60 and to calculate distances traveled in conjunction with a locomotive speed provided by the speed sensor 64.

The remote locomotive of FIG. 4 includes a processor 70 in communication with a memory 72 for storing processor instructions, a transceiver 74 for communication with other locomotives in a train (such as the lead locomotive 16 of FIG. 3), a clock 76, a speed sensor 86, and a transponder reader 44. The processor 70 includes logic operative with instructions stored in memory 72 and in communicates with the catenary connection controller 78, transceiver 74, speed sensor 86, clock 76, and transponder reader 44 to perform the methods described previously.

The transponder reader 44 reads a transponder 42, such as an AEI tag located near a neutral section, and indicates to the processor 70 when the locomotive 12 is approaching the neutral section. The transponder reader 44 may also provided a distance to the neutral section, for example, encoded in the transponder being read, to the processor 70.

The remote locomotive 12 also includes a catenary connection controller 78 in communication with the processor 70 for controlling a catenary electrical connection device 80, such as a circuit breaker. The connection device 80 may disconnect the locomotive control circuits 82 from the catenary 22 according to commands received from the catenary connection controller 78. The catenary connection controller 78 may also control a pantograph erector 84 to raise or lower the pantograph 24 according to commands provided by the processor 70.

The remote locomotive 16 may also include a location determination device such as a GPS receiver 52 in communication with a GPS satellite 54 for providing location information. The processor 70 may receive location information from the GPS receiver 52 and correlate the location information with a known neutral section location, for example, stored in memory 72, for determining a proximity to a neutral section.

The processor 70 may communicate with the clock 76 to provide time stamps for signals sent to other locomotives via the transceiver 74 and to calculate distances traveled in conjunction with a locomotive speed provided by the speed sensor 86. The processor 70 may command the catenary connection controller 78 to disconnect the remote locomotive 12 from the catenary 22 using the catenary electrical connection device 80, the pantograph erector 84, or both, according to signals received via the transceiver 74, such as signals transmitted from the lead locomotive of FIG. 3, signals received from the transponder reader 44 and/or signals received from GPS receiver 52. The signals may be processed according to the methods described previously to determine when the locomotive 12 needs to be disconnected from the catenary 22 upon arriving at a neutral section.

For example, the remote locomotive 12 may receive a signal provided by the lead locomotive 16 of FIG. 3 indicative of the lead locomotive 16 approaching the neutral section. The signal may include a distance to the neutral section and may be time stamped with a time provided by the lead locomotive's clock 62. Based on an elapsed time from receipt of the signal at the remote locomotive 12 and a remote locomotive speed provided by the speed sensor 86, the remote locomotive processor 70 may be configured to predict a time when the remote locomotive 12 has traveled a distance corresponding to a predetermined distance between the lead locomotive 16 and the remote locomotive 12. When the processor 70 determines that the remote locomotive 12 has traveled that distance, the processor 70 may command the catenary connection controller 78 to disconnect the remote locomotive 12 from the catenary 22 while passing through the neutral section. The processor 70 may further be configured to check a time stamp of the signal to a local time measured by the clock 76, for example, to compensate for any delays in signal transmission by adjust a timing of a neutral section operation accordingly.

Based on the foregoing specification, the methods described may be implemented using computer programming or engineering techniques including computer software, firmware, hardware or any combination or subset thereof, wherein the technical effect is to provide automatic control neutral section operations. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While the preferred embodiments of the present invention have been shown and described herein, it will be obvious that such embodiments are provided by way of example only. Numerous variations, changes and substitutions will occur to those of skill in the art without departing from the

We claim as our invention:

1. A method of controlling a neutral section operation of a train comprising a lead locomotive and at least one remote locomotive following the lead locomotive in the train in communication with the lead locomotive, the locomotives electrically powered from respective electrical connections to a catenary having at least one neutral section, the method comprising:
   determining, using a first technique and a second technique different from the first technique, when a remote locomotive of a train has arrived proximate a neutral section of a catenary; and
   performing a neutral section operation of the remote locomotive when the remote locomotive is determined to have arrived proximate the neutral section by either of the first and second techniques.

2. The method of claim 1, wherein one of the first and second techniques comprises calculating, at a lead locomotive of the train, when the lead locomotive has traveled a distance equal to a predetermined distance between the lead locomotive and the remote locomotive, based on a speed of the lead locomotive and an elapsed time from when the lead locomotive senses its location proximate the neutral section.

3. The method of claim 2, wherein one of the first and second techniques comprises determining when the remote locomotive has arrived proximate the neutral section by calculating, at the remote locomotive, when the remote locomotive has traveled the predetermined distance from a point when the remote locomotive receives an indication of the lead locomotive sensing its location proximate the neutral section, based on a speed of the remote locomotive and an elapsed time from receipt by the remote locomotive of the indication.

4. The method of claim 2, wherein one of the first and second techniques comprises determining when the remote locomotive has arrived proximate the neutral section by sensing, from the remote locomotive, a location of the remote locomotive proximate the neutral section.

5. The method of claim 1, wherein performing the neutral section operation comprises delaying performing the neutral section operation for a time delay period based on a speed of the train from when the remote locomotive is determined to have arrived proximate the neutral section so that a time period of the remote locomotive being electrically disconnected from the catenary is minimized.

6. Computer readable media containing program instructions for controlling a neutral section operation of a train comprising a lead locomotive and at least one remote locomotive following the lead locomotive in the train in communication with the lead locomotive, the locomotives electrically powered from respective electrical connections to a catenary having at least one neutral section, the computer readable media comprising:
   a computer program code for determining, using a first technique and a second technique different from the first technique, when a remote locomotive of a train has arrived proximate a neutral section of a catenary; and
   a computer program code for performing a neutral section operation of the remote locomotive when the remote locomotive is determined to have arrived proximate the neutral section by either of the first and second techniques.

7. A method of controlling a neutral section operation of a train comprising a lead locomotive and at least one remote locomotive following the lead locomotive in the train in communication with the lead locomotive, the locomotives electrically powered from respective electrical connections to a catenary having at least one neutral section, the method comprising:
   determining, in a first technique, when a remote locomotive of a train has arrived proximate a neutral section of a catenary by calculating, at a lead locomotive of the train, when the lead locomotive has traveled a distance equal to a predetermined distance between the lead locomotive and the remote locomotive, based on a speed of the lead locomotive and an elapsed time from when the lead locomotive senses its location proximate the neutral section;
   determining, in a second technique, when the remote locomotive has arrived proximate the neutral section by calculating, at the remote locomotive, when the remote locomotive has traveled the predetermined distance from a point when the remote locomotive receives an indication of the lead locomotive sensing its location proximate the neutral section, based on a speed of the remote locomotive and an elapsed time from receipt by the remote locomotive of the indication;
   determining, in a third technique, when the remote locomotive has arrived proximate the neutral section by sensing, from the remote locomotive, a location of the remote locomotive proximate the neutral section; and
   performing a neutral section operation of the remote locomotive when the remote locomotive is determined to have arrived proximate the neutral section by any one of the techniques.

8. A method of controlling a neutral section operation of a train comprising a lead locomotive and at least one remote locomotive in communication with the lead locomotive, the locomotives electrically powered from respective electrical connections to a catenary having at least one neutral section, the method comprising:
   sensing when a lead locomotive of a train is proximate a neutral section of a catenary; and
   commanding, from the lead locomotive, a remote locomotive of the train to perform a neutral section operation when the lead locomotive has traveled a distance equal to a distance between the lead locomotive and the remote locomotive, based on a speed of the lead locomotive and an elapsed time from when the lead locomotive senses its location proximate the neutral section.

9. The method of claim 8, wherein performing the neutral section operation comprises delaying performing the neutral section operation for a time delay period based on a speed of the train from when the remote locomotive is determined to have arrived proximate the neutral section so that a time period of the remote locomotive being electrically disconnected from the catenary is minimized.

10. The method of claim 8, wherein sensing comprises detecting from onboard the lead locomotive a transponder positioned proximate the neutral section.

11. The method of claim 8, wherein sensing comprises:
   receiving a GPS location signal at the lead locomotive; and
   correlating the GPS location signal with a predetermined location of the neutral section.

12. The method of claim 8, wherein the remote neutral section operation comprises electrically disconnecting the remote locomotive from the catenary.

13. Computer readable media containing program instructions controlling a neutral section operation of a train comprising a lead locomotive and at least one remote locomotive in communication with the lead locomotive, the locomotives electrically powered from respective electrical connections to a catenary having at least one neutral section, the Computer readable media comprising:

a computer program code for sensing when a lead locomotive of a train is proximate a neutral section of a catenary; and a computer program code for commanding, from the lead locomotive, a remote locomotive of the train to perform a neutral section operation when the lead locomotive has traveled a distance equal to a distance between the lead locomotive and the remote locomotive, based on a speed of the lead locomotive and an elapsed time from when the lead locomotive senses its location proximate the neutral section.

14. A method of compensating for a time delay for timing a neutral section operation of a train comprising a lead locomotive and at least one remote locomotive following the lead locomotive in the train in communication with the lead locomotive, the locomotives electrically powered from respective electrical connections to a catenary having at least one neutral section, the method comprising:

sensing a location of a lead locomotive of a train relative to a neutral section of a catenary;

generating a signal comprising a time stamp corresponding to a time when the location is sensed;

transmitting the signal from the lead locomotive to a remote locomotive;

receiving the signal at the remote locomotive;

determining a time delay between the time corresponding to the time stamp and a time measured on the remote locomotive when the remote locomotive receives the signal; and controlling a timing of a neutral section operation of the remote locomotive in response to the time delay.

15. The method of claim 14, wherein controlling a timing of a neutral section operation of the remote locomotive comprises adjusting a distance to be traveled by the remote locomotive to reach the neutral section to account for a travel distance the remote locomotive travels during the time delay.

16. The method of claim 14, wherein the time signal further comprises a distance parameter indicative of a distance of the remote locomotive from the neutral section.

17. The method of claim 16, wherein the distance parameter comprises a predetermined distance between the lead locomotive and the remote locomotive.

18. The method of claim 16, wherein controlling the timing of the neutral section operation of the remote locomotive comprises modifying the distance parameter to account for a travel distance the remote locomotive travels during the time delay.

19. The method of claim 14, further comprising:

calculating a time period measured from the time when the remote locomotive receives the signal required for the remote locomotive to travel a predetermined distance;

determining if a neutral section operation command expected to be received from the lead locomotive has not been received within the time period; and when the neutral section operation command has not been received within the time period, performing the neutral section operation.

20. A method for calibrating a distance measurement between a lead locomotive of a train and at least one remote locomotive following the lead locomotive in communication with the lead locomotive, the locomotives electrically powered from respective electrical connections to a catenary having at least one neutral section, the method comprising:

calculating a first distance traveled based on a speed of a lead locomotive of a train and an elapsed time from a time of the lead locomotive moving past a geographic point to a time of the lead locomotive receiving an indication of a remote locomotive of the train moving past the geographic point;

calculating a second distance traveled by the remote locomotive based on a speed of the remote locomotive and an elapsed time from a time of the remote locomotive receiving an indication of the lead locomotive moving past the geographic point to a time of the remote locomotive moving past the geographic point; and if a difference between the first and second distances is within a predetermined range, then using one of the first and second distances in a control scheme for controlling, from the lead locomotive, a neutral section operation of the remote locomotive.

21. The method of claim 20, further comprising sensing an occurrence of a first member of a train moving past a geographic point.

22. The method of claim 21, further comprising generating a first signal indicative of a time of the occurrence of the first member moving past the geographic point.

23. The method of claim 21, further comprising transmitting the first signal from the first member to a second member of the train.

24. The method of claim 23, further comprising receiving the signal at the second member.

25. The method of claim 24, further comprising sensing an occurrence of the second member moving past the geographic point.

26. The method of claim 25, further comprising generating a second signal indicative of the occurrence of the second member moving past the geographic point.

27. The method of claim 26, further comprising transmitting the second signal from the second member to the first member.

28. The method of claim 27, further comprising receiving the second signal at the first member.

* * * * *